United States Patent [19]

Rehmer et al.

[11] Patent Number: 5,073,611

[45] Date of Patent: Dec. 17, 1991

[54] COPOLYMERS CROSSLINKABLE BY ULTRAVIOLET RADIATION IN THE ATMOSPHERE

[75] Inventors: Gerd Rehmer, Beindersheim; Andreas Boettcher, Nussloch, both of Fed. Rep. of Germany

[73] Assignee: BASF Aktiengesellschaft, Ludwigshafen, Fed. Rep. of Germany

[21] Appl. No.: 692,796

[22] Filed: Apr. 29, 1991

Related U.S. Application Data

[63] Continuation of Ser. No. 505,989, Apr. 6, 1990, abandoned.

[30] Foreign Application Priority Data

Apr. 29, 1989 [DE] Fed. Rep. of Germany ....... 3914374

[51] Int. Cl.$^5$ ............ C08F 2/48; C08F 2/50; C08F 212/02
[52] U.S. Cl. ............ 526/208; 427/208.2; 427/208.4; 522/6; 522/33; 522/34; 522/35; 522/36; 526/301; 526/316; 526/319; 526/329.4; 526/329.5; 526/329.6; 526/329.7; 526/332; 526/343; 526/344; 526/346
[58] Field of Search ............ 526/208, 319, 329.4, 526/329.5, 329.6, 329.7, 332, 343; 522/33, 34, 35, 36; 427/208.2, 208.4

[56] References Cited

U.S. PATENT DOCUMENTS

| | | |
|---|---|---|
| 3,575,925 | 4/1971 | Skoultchi . |
| 4,737,559 | 4/1988 | Kellen et al. .......... 526/301 |

FOREIGN PATENT DOCUMENTS

| | | |
|---|---|---|
| 246848 | 11/1976 | European Pat. Off. . |
| 17364 | 10/1980 | European Pat. Off. . |
| 88300 | 9/1983 | European Pat. Off. . |
| 2357586 | 6/1974 | Fed. Rep. of Germany . . |
| 3323913 | 1/1986 | Fed. Rep. of Germany . |
| 2621096 | 10/1986 | Fed. Rep. of Germany . |
| 3613082 | 11/1986 | Fed. Rep. of Germany . |
| 1551599 | 11/1968 | France . |
| 7009629 | 1/1970 | Netherlands . |

*Primary Examiner*—Joseph L. Schofer
*Assistant Examiner*—Fred Zitomer
*Attorney, Agent, or Firm*—Oblon, Spivak, McClelland, Maier & Neustadt

[57] ABSTRACT

Copolymers which are curable by ultraviolet radiation in the air are prepared by a process in which a mixture of (A) from 80 to 99.9% by weight of olefinically unsaturated monomers, (B) from 0 to 10% by weight of a copolymerizable olefinically unsaturated, photoreactive compound which, in the excited state produced by UV radiation, is capable of abstracting hydrogen and (C) from 0 to 10% by weight of a polymerization-regulating photoreactive compound which, in the excited state, is capable of abstracting hydrogen is subjected to free radical polymerization, the sum of (B) and (C) being not less than 0.1% by weight and the stated percentages by weight being based on the sum of the weights of (A)+(B)+(C).

18 Claims, No Drawings

COPOLYMERS CROSSLINKABLE BY ULTRAVIOLET RADIATION IN THE ATMOSPHERE

This application i a continuation of application Ser. No. 07/505,989, filed on Apr. 6, 1990, now abandoned.

The present invention relates to materials which are crosslinkable by UV light in the air and can be used in particular as hotmelt adhesives, for coating mineral substances, for example roofing tiles, and as coatings. The materials should have high reactivity to UV radiation. When used as hotmelt adhesives, the products should have a low melt viscosity, good tack and high heat distortion resistance.

Dutch Patent Application 6 606 711 has disclosed pressure sensitive tapes which are produced by coating a sheet-like substrate with a polyacrylate adhesive, one or more monomeric acrylates, e.g. 2-ethylhexyl acrylate, being present and being polymerized by UV irradiation and subsequent heating. However, in order to obtain useful results, exposure must be effected under an inert gas atmosphere. Furthermore, the presence of readily volatile acrylates which may irritate the skin and eyes is a disadvantage.

Dutch Patent 7 009 629 furthermore discloses a process for the preparation of adhesives, in which mixtures of acrylates and methacrylates, such as 2-ethylhexyl acrylate, with organic polymers, such as cellulose derivatives, polyolefins or polyesters, as viscosity regulators, and if required together with a tackifier, such as polyvinyl methyl ether, are applied in a thin layer to a sheet-like substrate and are treated with high energy radiation. Here too, the presence of the monomeric (meth)acrylates which have an irritant effect and are readily volatile is a disadvantage, and furthermore the only products obtained are those whose cohesion is insufficient for many applications in the contact adhesives sector.

In the process of German Laid-Open Application DOS 2,357,586 for the production of self-adhesive coatings, ionizing radiation is used for irradiation, in particular of a mixture which is liquid at room temperature and consists of (A) a monoolefinically unsaturated monomer which forms tacky polymers at room temperature, (B) a diolefinically or polyolefinically unsaturated compound, (C) a polymer having a softening point of less than 50° C. and a mean molecular weight of from 500 to 10,000 and (D) a conventional photoinitiator, e.g. benzoin, acetophenone or benzophenone, and which is likewise applied to a sheet-like substrate. In this process too, acrylates and methacrylates of alkanols of 4 to 12 carbon atoms may be used as monomers (A). Although the adhesive layers produced by this process have high shear strength at room temperature and good surface tack, they exhibit relatively pronounced cold flow and insufficient high temperature shear strengths.

High energy radiation is also used in the process of European Patent 88,300, in which self-adhesive coatings are obtained by coating substrates with derivatives of dihydroxypropylacrylates mixed with polymers having a glass transition temperature of less than 0° C. and a K value of from 20 to 80 and/or a tackifier. Although good surface tack and good heat distortion resistance is obtained here, the irritant monomers and the necessity of working under an inert gas atmosphere are disadvantages.

Since photoinitiators have to be present in the case of materials which are to be crosslinked by UV radiation, these photoinitiators should be very highly soluble in the materials and should not exude from the materials, so that the latter can also be processed at elevated temperatures. Furthermore, these photoinitiators should not form any decomposition products which have a strong intrinsic odor and tend to exude on irradiation.

Polymerizable photoinitiators have therefore also been used in UV-curable materials. Thus, European Laid-Open Application 0,017,364 describes, for example, copolymers which are suitable, inter alia, as adhesives and for sealing compounds and which contain from 0.1 to 10% by weight of allylbenzoyl benzoate as a polymerized photoinitiator. Although these materials can be crosslinked by UV radiation, they give crosslinked products having a very high viscosity. Furthermore, their reactivity to UV radiation is too low, and tacky layers produced therewith do not meet the requirements set for a good contact adhesive. Moreover, irritant monomers are additionally used in this process (Example 10).

According to German Laid-Open Application DOS 2,411,169, contact adhesives crosslinkable by ultraviolet radiation can be prepared by using copolymers of (meth)acrylates which contain monoolefinically unsaturated ether and ester derivatives of substituted benzophenones as polymerized photoinitiators. However, the polymerized benzophenone derivatives are less reactive to UV radiation, and the pressure-sensitive adhesives prepared from the copolymers do not meet high requirements. Furthermore, hotmelt adhesives prepared by this process have an excessively high melt viscosity which prevents their use in practice.

European Laid-Open Application 0,246,848 also discloses contact adhesives which are crosslinkable by UV radiation and are based on polyacrylates which contain polymerized monoolefinically unsaturated benzophenone derivatives as photoinitiators. These contact adhesives are intended to be used in medicine, for example for plasters, and their adhesion to the skin should not increase in the course of time. However, a disadvantage of these contact adhesives is that they have only low reactivity to UV radiation and a comparatively high melt viscosity.

German Laid-Open Application DOS 3,613,082 describes the preparation of radiation-curable (UV radiation and electron beams) (meth)acrylated polyesters and their use for the preparation of contact adhesives. The disadvantages here are as follows: The UV-crosslinked contact adhesive layers have poor tack. The products crosslinked in the air do not meet the requirements set for a contact adhesive. The preparation is especially expensive; in particular, it is possible to dispense with the reaction with olefinically unsaturated compounds.

German Patent 3,323,913 discloses the preparation and use of polyisobutylenesuccinic half esters and their use for the preparation of an adhesive. However, these products do not meet the high requirements set for a contact adhesive. In particular, these products too must be subjected to a polymer-analogous reaction with compounds containing double bonds.

Finally, German Patent 2,621,096 describes halogen-containing photopolymerizable adhesives based on polycondensates and polyadducts. These products contain unsaturated organic compounds which have two or more radicals of acrylic acid or methacrylic acid. The disadvantages here are that the adhesives are used predominantly for laminating; in this case too it is not possible to dispense with olefinically unsaturated compounds and in particular it is impossible to omit halogenated (chlorine-containing) starting materials.

We have found that copolymers which are crosslinkable by ultraviolet radiation in the air are obtained in a simple manner if a mixture of
- (A) from 80 to 99.9% by weight of olefinically unsaturated monomers,
- (B) from 0 to 10% by weight of an olefinically unsaturated, photoreactive compound which, in the excited stated produced by UV radiation, is capable of abstracting hydrogen, and
- (C) from 0 to 10% by weight of a polymerization-regulating, regulating, photoreactive compound which, in the excited state, is capable of abstracting hydgrogen, is subjected to free radical polymerization. the sum of (B) and (C) being not less than 0.1% by weight, the stated percentages by weight being based on the sum of the weights of (A)+(B)+(C).

In a preferred variant of this process, a mixture of
- (A) from 80 to 99.9% by weight of olefinically unsaturated monomers,
- (B) from 0 to 10% by weight of a copolymerizable, olefinically unsaturated, photoreactive compound which, in the excited state produced by UV radiation, is capable of abstracting hydrogen, and
- (C) from 0.1 to 10% by weight of a polymerization-regulating, photoreactive compound which, in the excited state, is capable of abstracting hydrogen is subjected to free radical polymerization, the sum of (B) and (C) being not less than 0.1% by weight and the stated percentages by weight being based on the sum of the weights of (A)+(B)+(C).

Regarding the components to be used in the novel process, the following may be stated specifically: (A) Olefinically unsaturated monomers The copolymers (P) generally contain, as principal monomers, predominant amounts, i.e. 80–99.9, preferably 90–99.5, % by weight of (meth)acrylates of alkanols of 1 to 24 carbon atoms, such as methyl, ethyl, n-propyl, isopropyl. n-butyl, isobutyl, tert-butyl, 2-ethylhexyl, amyl, isoamyl, isooctyl, decyl, lauryl or stearyl (meth)acrylate. Other suitable compounds are vinyl esters of saturated carboxylic acids of 1 to 20 carbon atoms, such as vinyl formate, vinyl acetate, vinyl propionate, vinyl 2-ethylhexanoate, vinyl laurate and vinyl stearate, as well as vinyl ethers of 3 to 22 carbon atoms, such as methyl, ethyl, butyl, hexyl or octadecyl vinyl ether. Vinylaromatics of 8 to 12 carbon atoms, such as styrene, α-methylstyrene, vinyltoluenes, tert-butylstyrene and halostyrenes, are also suitable, as are monoolefins of 2 to 20 carbon atoms, such as ethylene, propylene, n-butylene, isobutylene, diisobutene, triisobutene and oligopropylenes and/or diolefins, such as butadiene, and/or vinyl halides, such as vinyl chloride and vinylidene chloride, as well as allyl ethers and allyl esters.

Furthermore, the copolymers (P) may contain from 0 to 20, preferably from 0.25 to 10, % by weight of $\alpha,\beta$-monoolefinically unsaturated acids as polymerized units. Examples of suitable compounds are mono- and dicarboxylic acids of 3 to 6 carbon atoms and the monoesters of dicarboxylic acids of 4 to 6 carbon atoms with alkanols of 1 to 24 carbon atoms and/or their anhydrides, and olefinically unsaturated sulfonic acids and phosphonic acids, such as vinylsulfonic acid and vinylphosphonic acid. (Meth)acrylic acid, crotonic acid, maleic acid, fumaric acid, itaconic acid, monomethyl, monobutyl, mono-2-ethylhexyl, monoisoamyl, monoisooctyl and/or monostearyl maleate and/or maleic anhydride, itaconic anhydride and (meth)acrylic anhydride are preferably used.

Another group of copolymers (P) contains from 0 to 20, preferably from 0.5 to 10, % by weight of tetrahydrofurfur-2-yl (meth)acrylate, tetrahydrofurfur-2-yl (meth)acrylamide and/or alkoxy-containing monomers, such as 3-methoxybutyl (meth)acrylate, 2-methoxyethyl (meth)acrylate, 2-butoxyethyl (meth)acrylate or 2-ethoxyethyl (meth)acrylate, preferably tetrahydrofurfur-2-yl (meth)acrylate, as polymerized units.

Another group of copolymers (P) contains from 0 to 20, preferably from 0.25 to 5, % by weight of N-substituted amides as polymerized units, such as N-vinylimidazole, N-vinylpyrrolidone, N-vinylformamide or (meth)acrylamide, and mono- and/or dialkyl(meth)acrylamides, such as N-methyl(meth)acrylamide, N-benzyl(meth)acrylamide, N-isobornylmethacrylamide and diacetoneacrylamide.

For the preparation of the copolymers (P), it is also possible to use monomers containing further functional groups, in amounts of from 0 to 10% by weight, for example hydroxyalkyl (meth)acrylates, such as 2-hydroxypropyl (meth)acrylate, 4-hydroxybutyl (meth)acrylate and 2-hydroxyethyl (meth)acrylate.

The copolymers (P) may also contain basic N-containing monomers in amounts of from 0 to 5% by weight as polymerized units, such as N,N-diethylaminoethyl (meth)acrylate or N,N-dimethylaminoethyl (meth)acrylate.

Another group of copolymers (P) contains, if necessary in addition to the stated monomers, from 0 to 20% by weight of polymerized monomers which contain heterocyclic and/or homocyclic rings, such as 2-N-morpholinoethyl (meth)acrylate, menthyl (meth)acrylate, cyclohexyl (meth)acrylate or N-isobornyl (meth)acrylate.

In particular, it is also possible to use reactive adhesion-promoting monomers for the preparation of the copolymers (P), such as 3-methacryloxypropyltrimethoxysilane, vinyltriethoxysilane or vinyltrimethoxysilane; all these are present in amounts of from 0 to 15% by weight.

A preferred group of copolymers (P) contains from 0 to 25, preferably from 0.5 to 5, % by weight of polymerized monomers which contain one or more spacer-bonded polar groups capable of hydrogen bridge formation; such monomers can be obtained, for example, by reacting hydroxyalkyl (meth)acrylates with succinic anhydride. Maleimido-N-hexanoic acid is also suitable. The reaction product of 1,4-butanediol mono(meth)acrylate and/or 1,2-ethanediol (meth)acrylate and/or 1,2- and/or 1,3-propanediol (meth)acrylate with succinic anhydride is preferably used from this group of monomers.

The copolymers (P) generally have K values, according to DIN 53,726, of from 8 to 150, preferably from 10 to 100, particularly preferably from 15 to 70, very particularly preferably from 20 to 55.

For the preparation of copolymers (P) which are suitable for contact adhesives, it is preferable to use monomers whose homopolymers have glass transition temperatures of less than 0° C., preferably those whose homopolymers have glass transition temperatures of less than −10° C., especially copolymers of n-butyl acrylate, of 2-ethylhexyl acrylate, of isoamyl acrylate or of isooctyl acrylate. (B) Copolymerizable olefinically unsaturated, photoreactive compounds which, in the excited state produced by UV radiation, are capable of abstracting hydrogen.

This class of substances includes compounds which, in addition to the group excitable by UV radiation, contain a copolymerizable double bond (in general (meth)acrylates) and which are incorporated in the polymer by copolymerization.

Compounds of class (B) which are suitable for the purpose according to the invention are those of the general formula

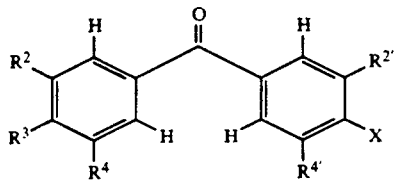

where

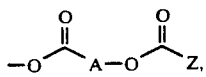

x is

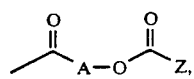

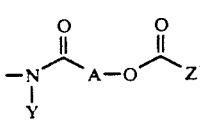

or

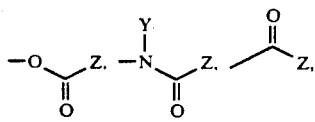

Z is

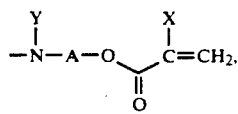

Y is H or $C_1$–$C_4$-alkyl,

A is a straight-chain or branched alkyl radical of 2 to 12 carbon atoms in which one or more —$CH_2$— groups can be replaced by O atoms, $R'^2$ and $R'^4$ are each H, $C_1$–$C_4$-alkyl, —O—$C_1$–$C_4$-alkyl or X, $R^2$ and $R^4$ ar each H, $C_1$–$C_4$-alkyl, —O—$C_1$–$C_4$-alkyl or $R^3$, $R^3$ is —H, —COOH, —$SO_3$H, —$CF_3$, $C_1$–$C_4$-alkyl, —O—$C_1$–$C_4$-alkyl or

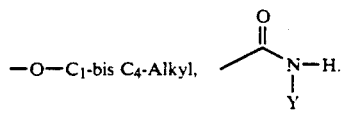

Preferred ecompounds are those in which

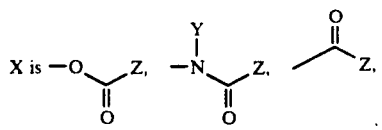

and particularly preferred compounds are those in which X is

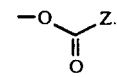

Specific examples of suitable compounds of class (B) are, for example, p-N-(methacryloyl-4-oxapentamethylene)-carbamoyloxybenzophenone and N-(benzoyl-p-phenylene)-N'-(methacryloxymethylene)-carbodiimide. (C) The polymerization-regulating photoreactive compounds which, in the excited state, are capable of abstracting hydrogen are known per se. They are in general photoreactive compounds which, in the excited state produced by UV radiation, are capable of extracting hydrogen (in this context see, for example, B. Nicholas J. Turro Modern Molecular Photochemistry, The Benjamin/Cummings Publishing Company Inc., Menlo Park, Calif. 1978).

The class of substances to be used according to the invention includes compounds which, in addition to the group which is excitable by UV radiation, contain substituents which regulate the polymerization (isopropyl roup, benzylic hydrogen atoms, —SH (mercapto groups), heteroatom-$CHR^IR^{II}$ groups); these compounds are incorporated in the copolymer by graft copolymerization (because of their regulating property).

Compounds of class (C) which are suitable for the purpose according to the invention are, for example, those of the general formula

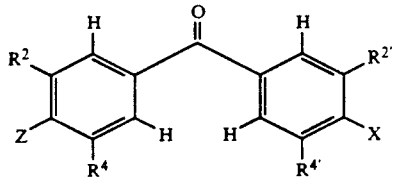

or

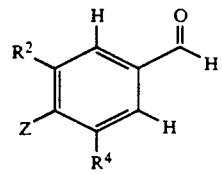

or

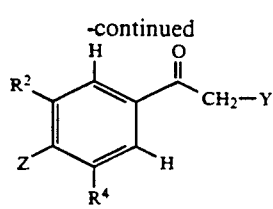

where Y is H or —CH₃,
X is H, —O—CH₃, —O—C₂H₅,

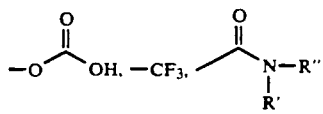

R' and R" may be identical or different and are each H or C₁-C₄-alkyl,

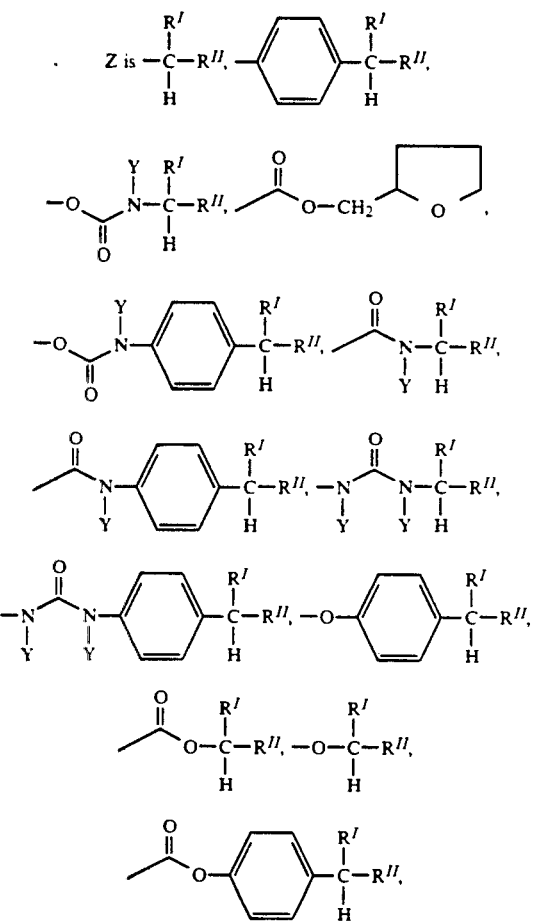

R² and R⁴ are identical or different and are each CH₃ or X,
R²' and R⁴ are identical or different and are each CH₃ or X.

The use of the polymerization-regulating photoinitiators of class (C) has the advantage that it is possible in some cases to dispense with external regulators and on the other hand the radiation-sensitive group is bonded at the end of the polymer chain. This has advantages with regard to the reactivity and the achievable mechanical properties in the case of, for example, contact adhesives. Furthermore, these compounds are generally simpler to prepare and significantly cheaper than the copolymerizable variants.

Examples of suitable polymerization regulating photoinitiators are the derivatives of benzaldehyde, of acetophenone, of benzophenone, of thioxanthone, of ethyl phenyl ketone, of anthraquinone, of benzosuberone and of benzil, which carry an isopropyl group, for example 4-isopropylbenzophenone, 4-isopropylthioxanthone, 4-isopropylacetophenone, i sopropyl 4-benzophenonecarboxylate, 4-isopropoxybenzophenone, 4-(4-isopropylphenyl)-benzophenone, 4-isopropyl-4,-trifluoromethylbenzophenone, 2-methoxy-4,-isopropylbenzophenone, 3-methyl-3,-isopropylbenzophenone or 4,4,-diisopropylbenzophenone.

Other preferred compounds are those of the constitution below, as obtained by reacting, for example, 4-hydroxybenzophenone with 4-isopropylphenyl isocyanate, isobutyl isocyanate or isopropylpropyl isocyanate:

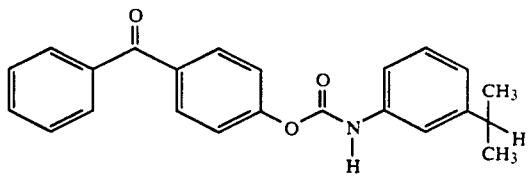

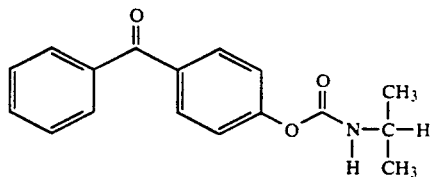

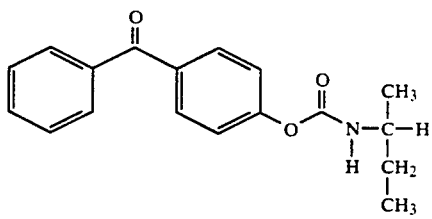

The copolymers (P) can be prepared by mass, solution or emulsion polymerization using suitable polymerization initiators. Processes of this type are known and the preparation of the copolymers (P) can thus be carried out similarly to German Patent 2,526,747, German Laid-Open Application DOS 3,018,131 or European Patent 3,516.

Since the copolymers are preferably used in the form of pure resins, the preparation of the copolymers by solution polymerization with subsequent removal of the volatile constituents and/or mass polymerization and removal of the volatile constituents is preferred.

For polymerization in solution, it is possible to use the conventional solvents, for example hydrocarbons, such as benzene, toluene, o-, m- and p-xylene, ethylbenzene, gasolines, n-hexane and cyclohexane, esters, such as ethyl acetate, alcohols, such as ethanol, methanol and isopropanol, ethers, such as dioxane and tetrahydrofuran, and mixtures of the stated solvents.

The amount of polymerization initiator is in general from 0.01 to 5% by weight, based on the sum of the weights of monomers (A) and (B) and of the compound(s) (C).

Suitable polymerization initiators are 2,2,-azobisisobutyronitrile (Porofor N), dimethyl 2,2,-azobisisobutyrate (V 601 from Wako), 4,4,-azobis-(4-cyanovaleric acid), peresters, such as tert-butyl perpivalate, tertbutyl peroctoate or tert-butyl perbenzoate, peroxides, such as dibenzoyl peroxide and dilauryl peroxide, hydroperoxides, such as cumene hydroperoxide, and peroxydicarbonates, such as dicyclohexyl peroxydicarbonate, and ketone peroxides, such as methyl ethyl ketone peroxide or cyclohexanone peroxide. The stated initiators can be used alone or together with other initiators. Dimethyl 2,2,-azobisisobutyrate (V 601) is preferably used. If the copolymers are prepared by emulsion polymerization, initiators such as ammonium peroxodisulfate, sodium peroxodisulfate or potassium peroxodisulfate or other watersoluble initiators may be used.

The stated initiators can be used alone or in combination. It is preferable to use dimethyl 2,2,-azobisisobutyrate in amounts of from 0.1 to 5.0% by weight.

In addition to the stated polymerizationregulating compounds (C), other compounds which reduce the degree of polymerization may be added to the reaction mixture for carrying out the polymerization. Mercaptans, such as mercaptoethanol, mercaptosuccinic acid, mercaptopropionic acid, mercaptoglycerol, 3-mercaptopropyltrimethoxysilane or 3-mercaptopropylmethyldimethoxysilane, ethers, such as dioxane, tetrahydrofuran, tetrahydrofurfuryl alcohol or tetrahydrofurfuryl acetate, alcohols, such as isopropanol, hydrocarbons, such as isopropylbenzene, etc. are among the compounds used for this purpose. These polymerization regulators are added in amounts of from 0 to 10% by weight, based on the sum of the weights A+B+C.

For carrying out the polymerization in solution, in general some or all of the solvent is heated with some of the monomer mixture and some or all of the polymerization initiator. When the polymerization begins, the remainder of the monomer mixture and, where relevant, the remainder of the polymerization initiator and any remaining solvent are added. The polymerization is preferably carried out in highly concentrated solution, preferably at monomer concentrations of more than 50, preferably more than 65, very particularly more than 80, % by weight.

The polymerization can be carried out under superatmospheric pressure, for example under from 1 to 100 bar, or under atmospheric pressure and at from 50 to 230° C., preferably from 70 to 120° C.

The compound (B), which is used in amounts of from 0 to 10, preferably from 0.01 to 5, very particularly preferably from 0.1 to 2.5, % by weight, based on the sum of the weights of (A) +(B) +(C), is as a rule dissolved in the monomers (A) and added in this form to the polymerizing reaction mixture. If necessary, it is also possible to dissolve the compound (B) in a suitable solvent and add this solution to the reaction mixture.

The compound (C), which is used in amounts of from 0 to 10, preferably from 0.1 to 7.5, very particularly preferably from 1.0 to 5, % by weight, based on the sum of the weights (A) +(B) +(C), is as a rule dissolved directly in the initially taken mixture to be polymerized In another embodiment of the polymerization, the compound C is dissolved in a solvent or in some of the monomer mixture and added to the polymerizing mixture in a time which is less than the feed time for the monomer solution, so that monomers still have to be added after the end of the addition of the compound (C).

When the copolymers are used as pure resins, after the end of the polymerization the solvent (mixture) is distilled off at a relatively high temperature, and solvent residues and any volatile constituents are removed under greatly reduced pressure at from 80° to 150° C.

Removal of the solvents and of the volatile constituents can be effected directly from the polymerization kettle; if necessary, the copolymer solution may be fed to a degassing apparatus, if required after being concentrated, and can be degassed there.

The resins prepared generally have solids contents of from 99.5 to 100% by weight.

The UV-crosslinkable copolymers to be used for contact adhesives generally have K values of from 20 to 65 and a loss on drying (LD) of <0.2% by weight.

The K value of the copolymers depends on the desired properties, in particular on the desired melt viscosity of the copolymers.

The choice and combination of the monomers (A) depend on the intended use of the UV-crosslinkable copolymers (P) and on the desired melt viscosity.

By selecting and matching the components (A) and (C), it is possible to prepare copolymers which have low K values but can still be rapidly cured by UV radiation. The achievable degree of crosslinking can be very easily adjusted by means of the amount of (B) and (C) used. The copolymers can thus be tailored to the particular intended use.

In particular, the novel process can be used to prepare copolymers which can be cured photochemically and chemically. For example, nontacky seals can be obtained by, for example, exposing moisture-curing sealing compounds to UV light (including sunlight) after their application, a nontacky surface being obtained The choice of components (B) and (C) depends in particular on their UV absorption spectra and their extinction coefficients; thus, simple optimum adaptation to existing UV lamps is still possible, and in particular copolymers which crosslink in natural sunlight can also be obtained.

The copolymers prepared according to the invention can be modified and/or compounded in a conventional manner.

For the use of the copolymers for contact adhesives, for example, the conventional tackifiers, such as hydrocarbon resins, unmodified or modified rosins, terpene/phenol resins, ketone resins or aldehyde resins, homopolymers, such as poly-2-ethylhexyl (meth)acrylate, polyisoamyl (meth)acrylate, polyisobutyl acrylate or poly-n-butyl acrylate and corresponding polymers, cumarone/indene resins, plasticizers based on mono-, di- or polyester compounds, polychlorinated hydrocarbons or liquid paraffins, natural and synthetic rubber, polyvinyl ether or other modifiers may be added.

A surprising advantage of the novel copolymers is that some of the modifiers are chemically bonded to the copolymers by UV irradiation; consequently, migration of the modifiers can be greatly restricted or completely eliminated.

Examples of suitable tackifiers are Foral 85, Pentalyn H and Staybelite Ester 10 (from Hercules Inc.), as well as polyvinyl ethers, such as the Lutonal grades from BASF, e.g. Lutonal I 30, and poly-n-butyl acrylate, such as Acronal 4 F (BASF). The tackifiers can be added to the novel agents in amounts of from 0 to 50% by weight.

The novel copolymers can also be further modified by the addition of mono- and/or polyolefinically unsaturated compounds and thus adapted to the particular requirements of the adhesives-processing industry. The olefinically unsaturated compounds are used for this purpose in amounts of from 0 to 50, preferably only from 0 to 10, particularly preferably from 0 to 5, % by weight.

The novel copolymers are particularly suitable as melts or as solutions or aqueous dispersions for the production of coatings and for impregnation, in particular for the production of pressure sensitive films, pressure sensitive labels, one-sided or double-sided pressure sensitive tapes, electrical insulations and blocking foils. The pure copolymers are preferably used.

The melts can be applied by means of conventional coating units, if necessary at a relatively high temperature, i.e. from 20° to 150° C., preferably up to 100° C., particularly up to 80° C., in the usual manner by spreading, spraying, roller coating, knife coating or pouring, to sheet-like substrates, for example to paper, cardboard, pulp, wood, metals or films, e.g. unplasticized or plasticized PVC, polyethylene, polyamide, polyethylene glycol terephthalate and in particular polypropylene, or foils, e.g. aluminum. Where the novel agents are used in the form of solutions or dispersions, the solvents or dispersants can be readily evaporated from the coated substrates, if necessary at room temperature or slightly elevated temperatures; drying can be effected in a conventional manner by using, for example, radiant heaters or heat circulation apparatuses, at from 20° to 150° C.

The coatings, which may have been dried or predried, are then crosslinked by exposure to ultraviolet light under an inert gas atmosphere or in the air to give thoroughly bonding coatings which have high cohesion and very good peel strength in combination with excellent aging resistance. The crosslinked anhydrous coatings show no blooming when stored in water.

The coated substrates can be exposed in a conventional manner to light from UV lamps, for example low pressure, medium pressure and high pressure mercury lamps of different powers, for example 80 W/cm, 100 W/cm or 120 W/cm; the choice of the lamp depends on, inter alia, the absorption spectrum of the copolymers and the compounds (B) and (C) used.

Lamps having a higher power generally permit more rapid crosslinking. Depending on the speed at which the coated substrate passes through the UV unit, one, two or more lamps are used in a unit.

In particular, the novel copolymers can be crosslinked in the air; exposure under an inert gas atmosphere is not necessary.

Surprisingly, the novel copolymers allow the irradiation process to be interrupted and continued at any time.

It is also surprising that even relatively thick layers of the novel copolymers can be rapidly crosslinked; the usual thicknesses of dry layers are from 10 to 100 μm. Crosslinking of even thicker layers is also possible and is dependent on the choice of the compounds (B) and (C).

Testing the performance characteristics

The adhesive properties of sheet-like substrates which have a contact adhesive layer can be determined by measuring the shear strength as a measure of the cohesion and the peel strength as an overall measure of cohesion and surface tack.

For the test, films of polyethylene glycol terephthalate or polypropylene are coated with the novel agents so that a coat of 25 g/mz or 50 g/m² results.

The coated films are placed on a moving continuous belt and passed at different speeds (from 5 to 20 m/min) under two consecutive medium pressure Hg UV lamps each of which has a radiant power of 80 W/cm. Irradiation is effected in the air.

The speed at which the coatings can pass through the UV unit in order to achieve adequate crosslinking depends, inter alia, on the K value of the copolymer. The higher the K value of the copolymers, the shorter the irradiation times required.

The films produced in this manner are cut into 2 cm wide strips and these strips are applied to a chromium-plated brass sheet. The sheet together with the strips is then stored for 24 hours at 23° C. and 65% relative humidity.

To measure the peel strength, the test strips are peeled off backward, parallel to the adhesive layer, at a speed of 300 mm/min. The force required for this purpose is measured.

In the measurement of the shear strength, a bonded area measuring 20×45 mm is cut out, the sheet is clamped vertically and the projecting part of the adhesive strip is loaded with a weight of 1 kg. The time taken to break the adhesive bond is determined. The measurement is carried out at 23° C. and 50° C. All measurements are carried out five times In the Examples which follow, parts and percentages are by weight. The K values were determined according to DIN 53,726, in 1% strength in tetrahydrofuran at 25° C.

The solids contents and the loss on drying (LD) of the resins were determined using an automatically recording thermal balance with a mounted infrared lamp, at 130° C. for 60 minutes The melt viscosities were obtained from the flow curves recorded using a plate-and-cone system. The copolymers used for contact adhesives have melt viscosities of from 30 to 10,000 Pa.s at 20° C.

The following copolymers mentioned in the Examples were prepared in a conventional polymerization apparatus equipped with a stirrer, various feed vessels, a reflux condenser, an inert gas connection, a heating-/cooling means and various monitoring thermometers, and for operation under superatmospheric pressure and reduced pressure.

The following abbreviations are used in the Examples

Compound B 1 =

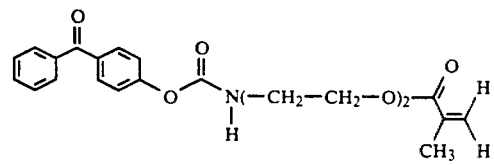

Compound B 2 =

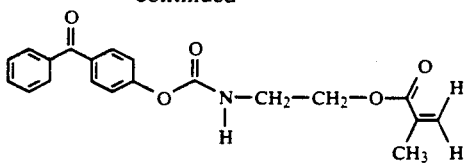

Compound C 1 = 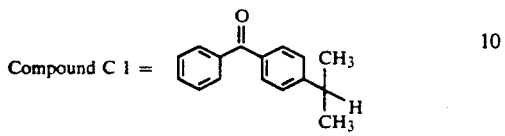

Compound C 2 = 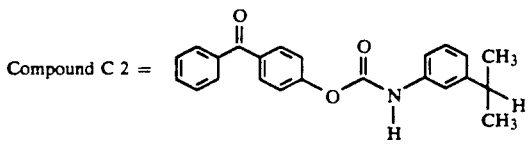

EXAMPLE 1

Copolymer P 1; UV-crosslinkable copolymer for contact adhesives

The remainder of the monomer mixture is added in the course of 3 hours to a gently refluxing mixture of 200 g of ethyl acetate, 50 g of tetrahydrofuran, 5 g of 2,2,-azobisisobutyronitrile and 200 g of a monomer mixture of 150 g of 2-ethylhexyl acrylate, 690 g of n-butyl acrylate, 100 g of methyl methacrylate, 50 g of methyl acrylate, 10 g of acrylic acid and 7 g of monomer B 1. Stirring is continued for 2 hours, after which a solution of 2 g of tert-butyl per-2-ethylhexanoate in 83 g of ethyl acetate is added. After the end of the addition, stirring is continued for a further 2 hours.

A copolymer P 1 having a K value of 44 is obtained. The copolymer has a melt viscosity of 30 Pa.s at 100° C.

The solvent is then distilled off under reduced pressure at elevated temperatures A copolymer which exhibits flow at room temperature is obtained.

EXAMPLE 2

Copolymer P 2; UV-crosslinkable copolymer for contact adhesives

A monomer mixture of 810 g of isoamyl acrylate, 175 g of n-butyl acrylate, 15 g of acrylic acid, 7.5 g of monomer B 2 and 5 g of the compound C 2 are polymerized in the manner described above using 5 g of dimethyl 2,2'-azobisisobutyrate (azo initiator Wako V 601); however, tetrahydrofuran is not added.

The copolymer P 2 has a K value of 25 and a melt viscosity of 15 Pa.s at 80° C.

EXAMPLE 3

Copolymer P 3; UV-crosslinkable copolymer for contact adhesives

A monomer mixture of 800 g of 2-ethylhexyl acrylate, 100 g of vinyl acetate, 30 g of methyl methacrylate, 20 g of the monoester of succinic acid with 1,4-butanediol monoacrylate, 25 g of acrylic acid and 25 g of diacetoneacrylamide, 7.5 g of compound B 1 and 2.5 g of 4-isopropylbenzochenone (C 1) are polymerized using 2,2,-azobisisobutyronitrile as a polymerization initiator in ethyl acetate.

A copolymer P 3 having a K value of 35 and a melt viscosity of 40 Pa.s at 50° C. is obtained.

EXAMPLES 4 TO 7

The following mixtures were prepared using the copolymers freed from volatile constituents:

| Mixture | Copolymer | Modifier |
|---|---|---|
| M 4 | 90% by weight of P 3 | 10% by weight of Acronal 4 F (BASF) |
| M 5 | 90% by weight of P 3 | 10% by weight of Lutanol I 30 (BASF) |
| M 6 | 90% by weight of P 3 | 5% by weight of Staybelite Ester 10 |
| M 7 | 90% by weight of P 3 | 10% by weight of Staybelite Ester 10 |

TABLE 1

| | Irradiation conditions | Coat applied | |
|---|---|---|---|
| Example No. | Copolymer/ mixture | per unit area [g/m²] | Belt speed [m/min] |
| 1 | P 1 | 25 g | 10 |
| 2 | P 2 | 25 g | 20 |
| 3 | P 2 | 50 g | 15 |
| 4 | M 4 | 25 g | 15 |
| 5 | M 5 | 25 g | 15 |
| 6 | M 6 | 25 g | 15 |
| 7 | M 7 | 25 g | 15 |

TABLE 2

Results of testing of the performance characteristics as contact adhesives

| Example No. | Shear strength [h] at | | Peel strength [N/2 cm] | | Tack*) |
|---|---|---|---|---|---|
| | 23° C. | 50° C. | immediately | after 24 h | |
| 1 | >24 | >6 | 5.0 | 7.6 | Good |
| 2 | >24 | >24 | 6.7 | 9.2 | Good |
| 3 | >24 | >24 | 7.5 | 11.5 | Good |
| 4 | >24 | >24 | 3.0 | 4.5 | Good |
| 5 | >24 | >9 | 3.0 | 5.0 | Good |
| 6 | >24 | >7 | 5.0 | 8.5 | Good |
| 7 | >24 | >3 | 7.0 | 12.0 | Good |

*)The tack was evaluated by a group.

We claim:
1. A process for the preparation of a copolymer which is crosslinkable by ultraviolet radiation in the air, wherein a mixture of
(A) from 80 to 99.9% by weight of the polymer of olefinically unsaturated monomers, comprising at least one member from the group consisting of (meth)acrylates of alkanols of 1 to 24 carbon atoms, vinyl esters of saturated carboxylic acids of 1 to 20 carbon atoms, vinyl ethers of 3 to 22 carbon atoms, vinyl aromatics of 8 to 12 carbon atoms, halo styrenes, monoolefins of 2 to 20 carbon atoms; butadiene, vinyl chloride, and vinylidene chloride;
(B) from 0.01 to 10% by weight of the polymer of copolymerizable, olefinically unsaturated photoreactive compound which, in the excited state produced by UV radiation, is capable of abstracting hydrogen, having the formula:

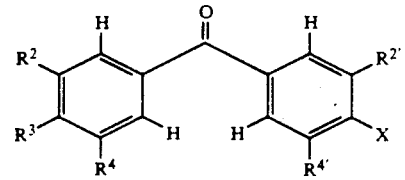

-continued where X is

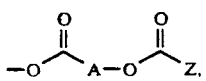

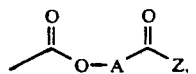

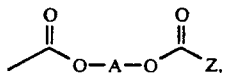

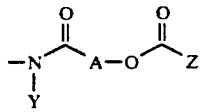

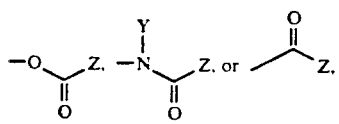

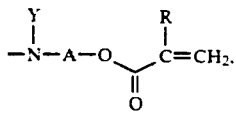

Y is H or $C_1$-$C_4$-alkyl,

A is a straight-chain or branched alkyl radical of 2 to 12 carbon atoms in which one or more —$CH_2$— groups can be replaced by O atoms, $R^5$ is H or $CH_3$, $R^{2'}$ and $R^{4'}$ are each H, $C_1$-$C_4$-alkyl, —O—$C_1'C_4$-alkyl or X, $R^2$, $R^3$ and $R^4$ are each H, $C_1$-$C_4$-alkyl, —O—$C_1$-$C_4$-alkyl, —COOh, —$SO_3H$, —$CF_3$, or

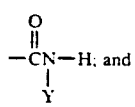

(C) from 0.01 to 10% by weight of a polymerization-regulating, photoreactive compound which, in the excited state, is capable of abstracting hydrogen having the formula:

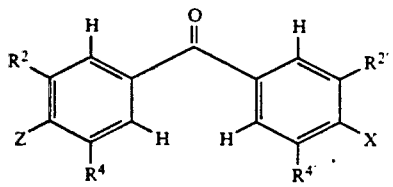

or

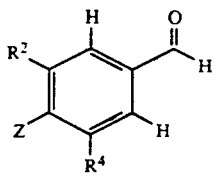

-continued
or

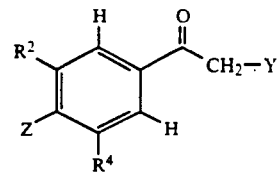

where Y is H or —$CH_3$,
X is H, —O—$CH_3$, —O—$C_2H_5$,

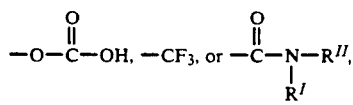

where
$R^I$ and $R^{II}$ may be identical or different and are each H or $C_1$-$C_4$-alkyl,

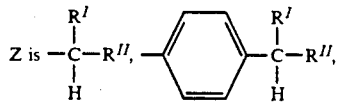

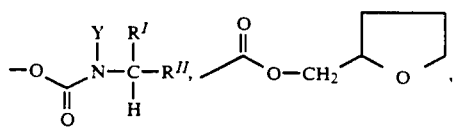

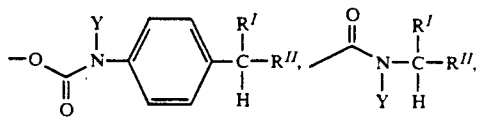

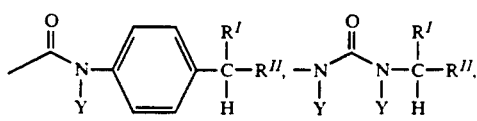

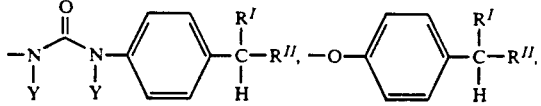

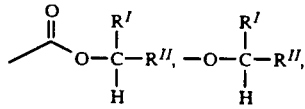

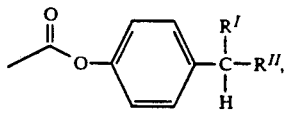

$R^2$ and $R^4$ are identical or different and are each $CH_3$ or X, $R^{2'}$ and $R^{4'}$ are identical or different and are each $CH_3$ or X is subjected to free radical polymerization and the stated percentages by weight being based on the sum of the weights of (A)+(B)+(C).

2. The process of claim 1, wherein component (B) is at least one member selected from the group consisting of p-N-(methacryloyl-4-oxapentamethylene)-carbamoyloxybenzophenone, N-(benzoyl-p-phenylene)-N'-methacryloxymethylene)carbodiimide,

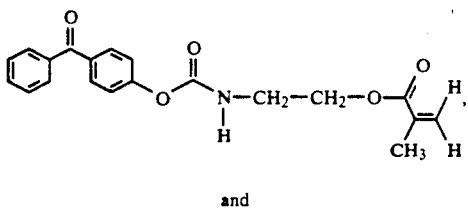

and

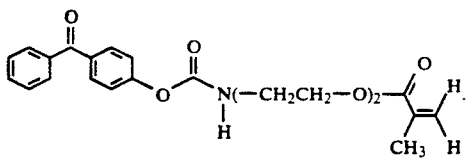

3. A copolymer defined by the process of claim 1 or 2.

4. The process of claim 4, wherein component (A) is present in from 90 to 99.5% by weight of the copolymer.

5. The process of claim 1, wherein component (A) further comprises up to 20% by weight of the copolymer of at least one member of the group consisting of α,β-unsaturated mono- and dicarboxylic acids of 3 to 6 carbon atoms, anhydrides of α,β-unsaturated dicarboxylic acids of from 4 to 6 carbon atoms, monoesters of α,β-unsaturated dicarboxylic acids of from 4 to 6 carbon atoms with alcohols of from 1 to 24 carbon atoms, vinylsulfonic acid, and vinyl phosphoric acid.

6. The process of claim 1, wherein component (A) further comprises up to 20 by weight of the copolymer of at least one member of the group consisting of tetrahydrofurfur-2-yl (meth)acrylate, tetrahydrofurfur-2-yl (meth)acrylamide, 3-methoxybutyl (meth)acrylate, 2-methoxyethyl (meth)acrylate, 2-butoxyethyl (meth)acrylate and 2-ethoxyethyl (meth)acrylate.

7. The process of claim 1, wherein component (A) further comprises up to 20% by weight of the copolymer of at least one member of the group consisting of N-vinylimidazole, N-vinylpyrrolidone, N-vinylformamide, N-vinyl(meth)acrylamide, N-methyl(meth)acrylamide, N-benzyl(meth)acrylamide, N-isobornylmethacrylamide, and diacetoneacrylamide.

8. The process of claim 1, wherein component (A) further comprises up to 10% by weight of the copolymer of at least one member of the group consisting of 2-hydroxypropyl (meth)acrylate, 4-hydroxybutyl (meth)acrylate and 2-hydroxyethyl (meth)acrylate.

9. The process of claim 1, wherein component (A) further comprises up to 5% by weight of the copolymer of N,N-diethylaminoethyl (meth)acrylate or N,N-dimethylaminoethyl (meth)acrylate.

10. The process of claim 1, wherein component (A) further comprises up to 20% by weight of the copolymer of 2-N-morpholinoethyl (meth)acrylate, menthyl (meth)acrylate or cyclohexyl (meth)acrylate.

11. The process of claim 1, wherein component (A) further comprises up to 15% by weight of the copolymer of at least one member of the group consisting of 3-methacryloxypropyltrimethoxysilane, vinyltriethoxysilane and vinyltrimethoxysilane.

12. The process of claim 1, wherein component (A) further comprises from 0.5 to 5% by weight of the copolymer of at least one member of the group consisting of maleimido-N-hexanoic acid, and the reaction products of succinic anhydride with 1,4-butanediol mono(meth)acrylate, 1,2-ethanediol (meth)acrylate, 1,2-propanediol (meth)acrylate and 1,3-propanediol (meth)acrylate.

13. The process of claim 1, wherein from 0.01 to 5% by weight of the copolymer of component (B) is present in the mixture subjected to free radical polymerization.

14. The process of claim 13, wherein component (B) is selected from the group consisting of p-N-(methacryloyl-4-oxapentamethylene)-carbamoyloxybenzophenone and N-(benzoyl-p-phenylene)-N'-(methacryloxymethylene)-carbodiimide.

15. The process of claim 6, wherein from 0.1 to 7.5% by weight of component (C) is employed in he mixture subjected to free radical polymerization.

16. The process of claim 15, wherein from 1 to 5% by weight of the copolymer of component (C) is present in the mixture subjected to free radical polymerization.

17. The procses of claim 6, wherein component (C) is selected from the group consisting of 4-isopropylbenzophenone, 4-isopropylthioxanthone, 4-isopropylacetophenone, isopropyl 4-benzophenonecarboxylate, 4-isopropoxybenzophenone, 4-(4-isopropylphenyl)-benzophenone, 4-isopropyl-4'-trifluoromethylbenzophenone, 2-methoxy-4'-isopropylbenzophenone, 3-methyl03-isopropylbenzophenone, 4,4'-diisopropylbenzophenone, and the reaction products of 4-hydroxybenzophenone with 4-isopropylphenyl isocyanate, isobutyl isocyanate, and isopropyl isocyanate.

18. The process of claim 1, further comprising the step of irradiating said copolymer with ultraviolet light in the air.

* * * * *